G. SHIRK.
FLUID CLUTCH.
APPLICATION FILED JUNE 12, 1919.
1,360,807.
Patented Nov. 30, 1920.
3 SHEETS—SHEET 1.
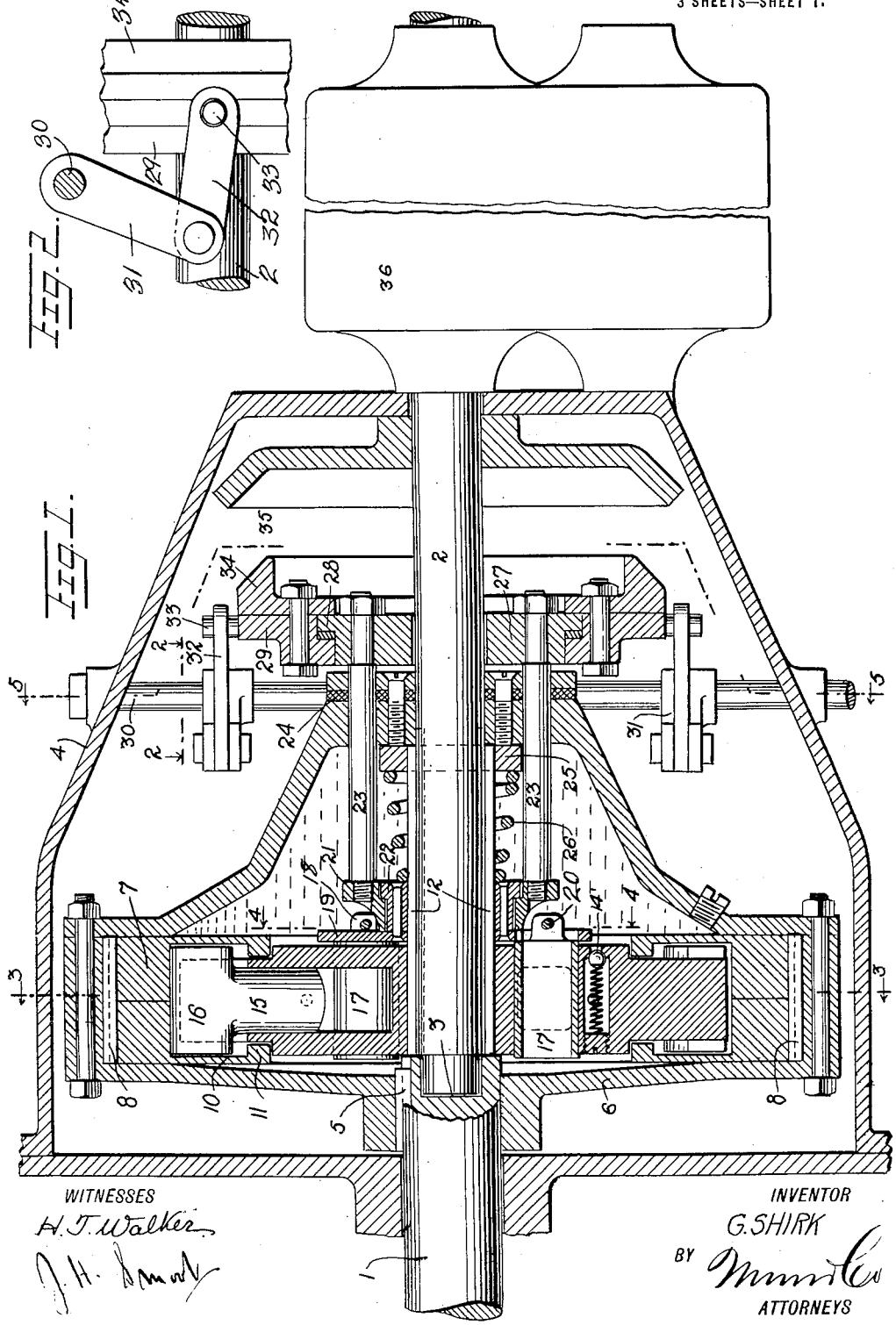
WITNESSES
H. J. Walker
INVENTOR
G. SHIRK
BY
ATTORNEYS

G. SHIRK.
FLUID CLUTCH.
APPLICATION FILED JUNE 12, 1919.

1,360,807.

Patented Nov. 30, 1920.
3 SHEETS—SHEET 2.

WITNESSES
H. T. Walker

INVENTOR
G. SHIRK
BY
ATTORNEYS

G. SHIRK.
FLUID CLUTCH.
APPLICATION FILED JUNE 12, 1919.

1,360,807.

Patented Nov. 30, 1920.
3 SHEETS—SHEET 3.

WITNESSES
H. T. Walker

INVENTOR
G. SHIRK
BY
ATTORNEYS

UNITED STATES PATENT OFFICE.

GOTHHOLT SHIRK, OF COLUMBUS, OHIO.

FLUID-CLUTCH.

1,360,807.  Specification of Letters Patent.  Patented Nov. 30, 1920.

Application filed June 12, 1919. Serial No. 303,703.

*To all whom it may concern:*

Be it known that I, GOTHHOLT SHIRK, a citizen of the United States, and a resident of Columbus, in the county of Franklin and State of Ohio, have invented a new and Improved Fluid-Clutch, of which the following is a full, clear, and exact description.

This invention relates to a clutch, and aims to more particularly provide a device of this nature wherein power from the driving shaft may be transmitted to the driven shaft with a maximum of flexibility.

A further object of this invention is the construction of a clutch which is peculiarly adapted to be utilized in connection with vehicles such as automobiles, and it aims, when applied to a comparatively light automobile, to result in the dispensing of the various gears used at the present time to vary the speed of the driven shaft with respect to the driving shaft. When this clutch is applied to heavier cars, such as a truck or delivery wagon, it will be necessary to provide only a single intermediate speed. It might, of course, be found advisable to make the same provision in lighter cars, but for all practical purposes it is thought that no intermediate gear will be necessary when a clutch of this type is utilized, the clutch functioning in such a manner as to produce a result similar to that of a magnetic clutch, which, when applied to cars, results in the elimination of intermediate gears, also.

As is well known, however, the magnetic type of clutches are extremely liable to get out of adjustment, due to short circuits, induction, and various other causes. My object in constructing this clutch is to provide a clutch which shall have all of the advantages of flexibility of operation of clutches of the magnetic type, but none of their disadvantages, and which shall require a minimum of attention.

Having these objects in mind, reference is had to the accompanying drawings which illustrate one practical embodiment of my invention, in which—

Figure 1 is a sectional side view taken along line 1—1 of Fig. 3;

Fig. 2 is a sectional plan view taken along line 2—2 of Fig. 1;

Figure 3:
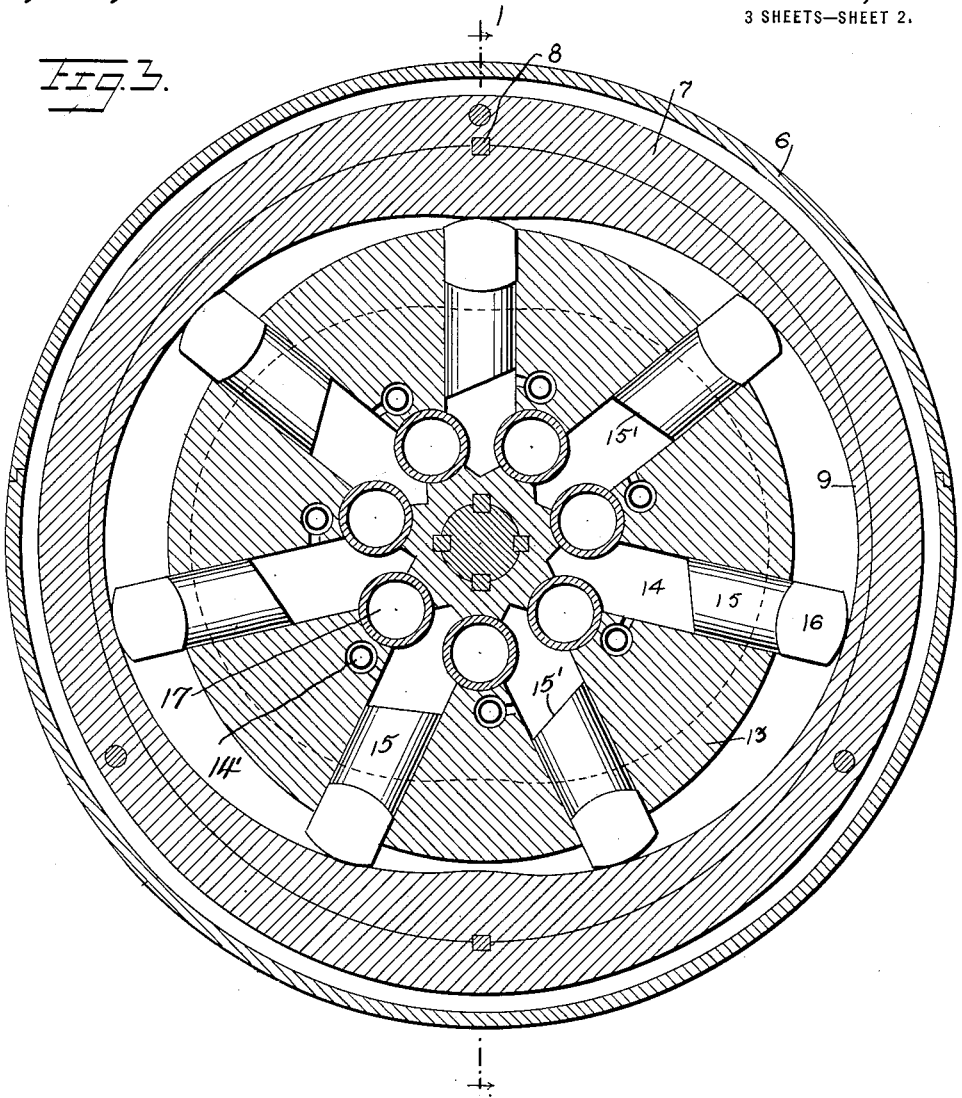
Fig. 3 is a section taken along line 3—3 of Fig. 1.

In all of these various views, like reference numerals designate similar parts, and the reference numeral 1 indicates the driving shaft, and 2, the driven shaft, which are in contact, as indicated by the reference numeral 3 in Fig. 1. The usual clutch casing 4 envelops the entire apparatus, the driving and driven shafts 1 and 2 respectively projecting through the same.

Keyed, or otherwise secured, to the driving shaft 1, as indicated by the reference numeral 5, is a hollow flywheel 6 which has its rear end extending around and rotatable with respect to the driven shaft 2. Applied to the interior of the flywheel 6 is a ring, such as 7, which may be keyed to the hollow flywheel 6, as indicated by the reference numeral 8. The inner face of the ring 7 is preferably formed eccentrically with respect to the outer surface thereof, for a purpose hereinafter more fully set forth, as indicated by the reference numeral 9. Flanges, such as 10, project beyond the inner face of the ring-shaped member 7 and terminate in inwardly-bent ends, as indicated by the reference numeral 11.

Keyed to the shaft 2, as indicated by the reference numeral 12, is a rotor, which includes a body portion 13 formed with radially-extending bores 14 in which are slidably mounted pistons 15 formed with enlarged heads 16, the rotor being so positioned within the hollow flywheel 6 that the enlarged heads 16 of the pistons 15 are capable of engaging the inner face of the ring 7.

Positioned to one side of the bores 14 are check valves 14', which are adapted to permit fluid taken into the hollow flywheel 6 to enter into the bores 14; and the pistons 15 have their lower ends biased, as in 15', so that even in their lower positions the pistons 15 do not cover up the bores controlled by the check valves 14'.

Figure 4:
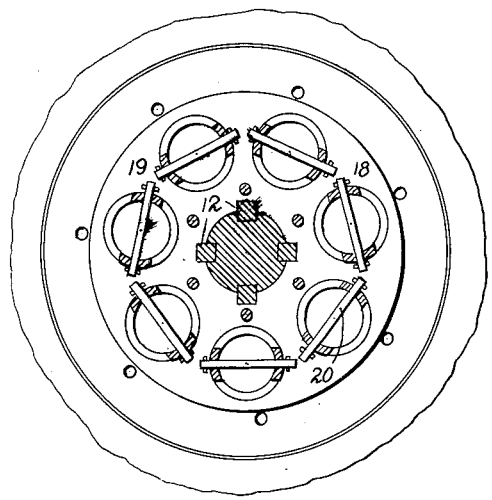
Fig. 4 is a section taken along line 4—4 of Fig. 1.
Figure 5:
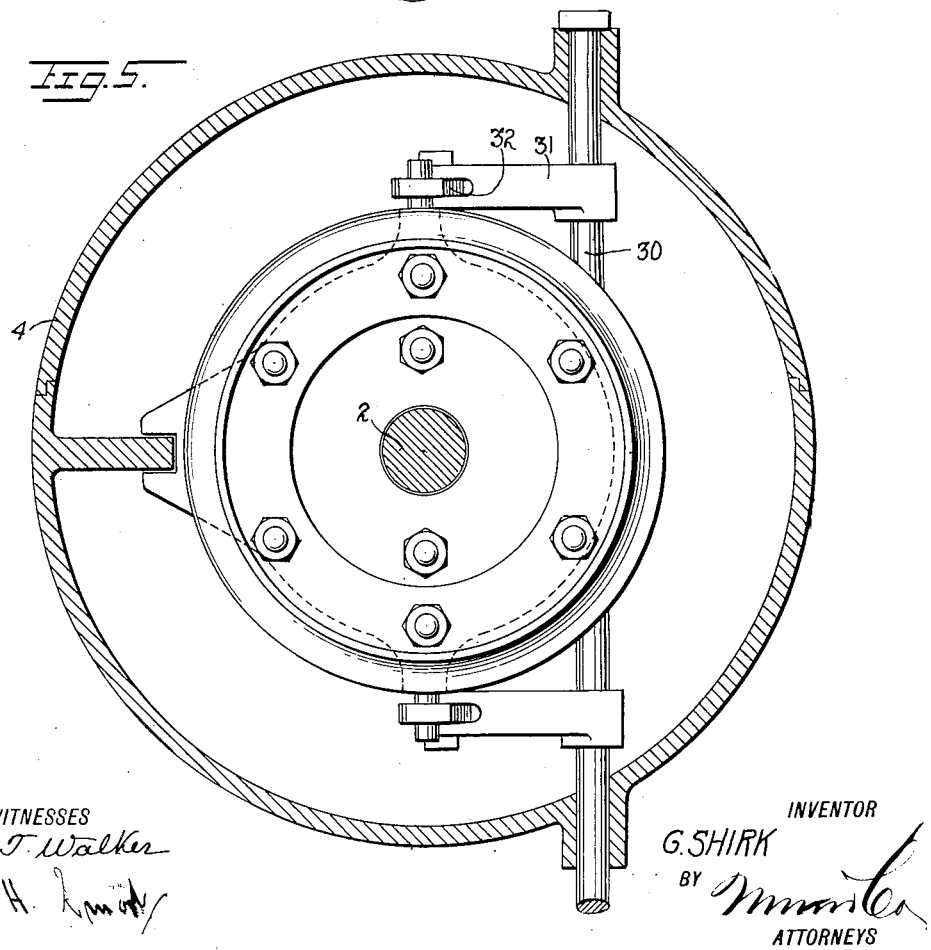
Fig. 5 is a sectional end view taken along line 5—5 of Fig. 1.

Extending transversely through the rotor 13 and between the bores 14 are additional bores in which are mounted plungers 17, which are preferably formed of tubular metal. The ends of these plungers 17 are formed with lugs 18, as clearly shown in Fig. 4, which lugs are adapted to project through openings formed through a plate 19 which encircles the driven shaft 2 and upon which it is non-rotatably held by means of the keys 12. The plungers 17 are secured to the plate 19 by any suitable arrangement, such as cotter or other convenient pins 20 passing through the lugs 18 and preventing their removal from the plate 19.

The plate 19 is mounted for sliding motion with respect to the driven shaft 2, and such sliding motion is controlled by means of a collar, as for instance, 21, which may engage a flange 22 conveniently made a part of the plate 19. Controlling rods 23 have one of their ends secured to the collar 21 and have their opposite ends projecting through openings formed in the rear end of the hollow flywheel 6, suitable packing, as, for instance, 24, serving to prevent leakage of the oil, or other suitable fluid within the hollow flywheel. A plate 25 may bear against the inner face of the outer end of the hollow flywheel 6, and a heavy coil, or other, spring 26 is adapted to be interposed between the flange 22 and said plate 25 for a purpose brought out in connection with the construction of the device. The outer ends of the controlling rods 23 are firmly secured to a disk 27 rotatably mounted upon the shaft 2, which disk is shouldered, as indicated by the reference numeral 28, so as to rotatably engage the shouldered ring 29.

For throwing the clutch into and out of operation, I provide a shaft 30 extending transversely through the clutch casing 4, to one end of which shaft there may be secured any suitable operating device, such as a clutch pedal, hand lever, etc. (not shown). Arms 31 are secured to the shaft 30 and are provided at their outer ends with a pivotally-mounted link 32 which engages trunnions, as, for instance, 33, formed upon the outer face of the shouldered ring 29.

I preferably associate with my clutch a brake by means of which the clutch may not alone be disengaged so as to prevent the transmission of power from the driving shaft to the driven shaft, but also in which, after such clutch has been disengaged, the driven shaft may be brought to an immediate stop, should it be so desired. To perform this function, I preferably affix to the outer face of the shouldered ring 29 a conventional male member 34 of a cone brake, which engages a female member 35 affixed to the shaft 2 and immovable with respect thereto.

In operation it will now be appreciated that if it is desired to impart rotation to the driven shaft 2 from the driving shaft 1, this may be accomplished by permitting the parts to assume the position indicated in Figs. 1 and 3. In this position of the parts, the enlarged heads 16 of the pistons 15 would so firmly engage the eccentric inner face 9 of the ring 7 as to firmly lock the driven shaft 2 with respect to the driving shaft, by virtue of the fact that the plungers 17 do not permit the escape of any fluid from out of the bores 14, and, consequently, the pistons 15 are incapable of being retracted; further, the check valves 14", although permitting fluid to normally enter the bores 14, prevent the egress of the same.

If it is now desired to disengage the clutch so that the driving shaft 1 and driven shaft 2 will no longer be coupled together, this may readily be accomplished by rotating the shaft 30 whereby to cause the arms 31 to exert a push upon the links 32, which in operation will force the ring 29 outwardly along the driven shaft 2. This action will move the disk 28 longitudinally of the shaft 2, as, although the disk 28 is rotatable with respect to the ring 29, it is not movable longitudinally with respect to the same. Upon the disk 28 being moved outwardly, the controlling rods 23 will retract the collar 21, flange 22, and plate 19, along the driven shaft 2 against the tension of the spring 26. This action will result in withdrawing the plungers 17 from their bores, thus permitting the fluid trapped within the bores 14 to escape, and permit the pistons 15 to move inwardly within the bores 14 of the rotor 13, by reason of which the rotor and, consequently, the driven shaft 2, will be entirely disengaged from the ring 7 and the driving shaft 1.

Should it now be desired to gradually couple the driving shaft 1 with the driven shaft 2, it will readily be appreciated that the controlling lever may be permitted to move rearwardly to any degree and gradually be allowed to move to its final position, such as illustrated in Fig. 1, to positively connect the driving and driven shafts together. It will be seen that this gradual engagement will cause no appreciable wear, such as would result in an ordinary clutch, in view of the fact that the outer faces of the enlarged heads 16 of the pistons 15 would gradually come into engagement with the inner face of the ring 7; and as the plungers 17 are allowed to enter their respective bores more and more, and thus prevent the escape of any fluid from the bores 14, the pistons 15 would gradually become immovable and the frictional engagement between the outer faces of their enlarged heads and the inner face of the ring 7 will be such as to prevent the movement of one with respect to the other.

Finally, should it be desired to apply a brake, this may be accomplished by not only throwing the manually-operated lever around sufficiently to disengage the clutch, but also by depressing the same further, whereby the parts 34 and 35 are engaged one with the other and any further rotation of the shaft 2 is prevented.

It is to be appreciated that any number of variations may be made in connection with my improved clutch without in the least departing from the scope of my invention; and it is to be understood that proper lubricating openings, etc., are to be provided throughout the entire apparatus. Further, any suitable controlling levers and brakes may be utilized in connection therewith.

Having thus described my invention, I desire to claim:

1. A clutch, including in combination with a driving and a driven shaft, a hollow fly wheel attached to the end of one of said shafts, the inner face of said fly wheel presenting cam surfaces, a rotor concentric with and within said fly wheel, said rotor being attached to the second of said shafts, and being formed with radially extending openings and transversely extending openings communicating with the inner face of said radially extending openings, all of said openings normally connecting with one another, pistons mounted within said radial openings, plungers slidably mounted within said transversely extending openings, means for moving such plungers whereby to prevent communication between the rotor openings upon said plungers being projected within the same, said rotor being formed with openings, one to each side of said radially extending openings, and in communication therewith, and a check valve associated with each of said last named openings.

2. A clutch, including in combination with a driving and driven shaft, a hollow fly wheel attached to one of said shafts, the inner face of such fly wheel being cam shaped, a rotor attached to the second of said shafts, said rotor being formed with radially and transversely extending openings, the latter openings communicating with the inner end of the first named openings, pistons slidably mounted within said radial openings and being adapted to engage the cam surface of said fly wheel, plungers slidably mounted within said transversely extending openings and being adapted to prevent communication between said radial openings and means for causing a retraction of said plungers, said means including a plurality of lugs formed upon the inner ends of said plungers, a plate slidably encircling said driven shaft, said plate being formed with openings adapted to aline with said lugs, means adapted to engage said lugs and to prevent movement on the part of the plate with respect thereto, and means for moving said plate.

3. A clutch, including in combination with a driving and a driven shaft, a hollow fly wheel attached to the end of one of said shafts, the inner face of said fly wheel presenting cam surfaces, a rotor concentric with and within said fly wheel, said rotor being attached to the second of said shafts, and being formed with radially extending openings and transversely extending openings communicating with the inner face of said radially extending openings, all of said openings normally connecting with one another, pistons mounted within said radial openings, and having their inner ends biased, plungers slidably mounted within said transversely extending openings, means for moving such plungers whereby to prevent communication between the rotor openings upon said plungers being projected within the same, said rotor being formed with openings, one to each side of said radially extending openings, and in communication therewith, and a valve associated with each of said last named openings, the upper-most portions of the inner ends of said pistons at all times lying radially outward of said openings.

GOTHHOLT SHIRK.